United States Patent [19]

Newman et al.

[11] Patent Number: 4,752,899
[45] Date of Patent: Jun. 21, 1988

[54] CONDITION MONITORING SYSTEM FOR LOCOMOTIVES

[76] Inventors: John W. Newman, 601 Maplewood Ave.; John Tyson, II, 311 Conestoga Rd., both of Wayne, Pa. 19087; Thomas Gluyas, 168 Eighth St., Avalon, N.J. 08202

[21] Appl. No.: 790,480

[22] Filed: Oct. 23, 1985

[51] Int. Cl.$^4$ .............................................. G06F 15/20
[52] U.S. Cl. .................................... 364/550; 364/424; 340/52 R
[58] Field of Search ....................... 364/424, 426, 550; 340/52 R, 52 F

[56] References Cited

U.S. PATENT DOCUMENTS

| 4,009,375 | 2/1977 | White et al. | 364/424 |
| 4,041,470 | 8/1977 | Slane et al. | 364/424 |
| 4,432,064 | 2/1984 | Barker et al. | 364/550 |
| 4,626,996 | 12/1986 | Arlott | 364/424 |

Primary Examiner—Gary Chin
Attorney, Agent, or Firm—William H. Eilberg

[57] ABSTRACT

The present invention is a system for monitoring and displaying a measured parameter in each of a series of similar modules. In one embodiment, the invention can be used to monitor a parameter or condition, such as the amount of fuel in a tank, in each of a plurality of coupled locomotives. The parameter is measured by an analog or digital sensor, the output of which is connected to a microprocessor. Each locomotive in the train has such a microprocessor, and each microprocessor is programmed in substantially the same way. The microprocessors in the several locomotives are programmed to communicate with each other, and to determine which one is in the lead locomotive, and what signals are being received from which microprocessor. The value of the measured parameters for any of the locomotives of the train can therefore be displayed by the microprocessor in the lead locomotive. The programming of the microprocessors is such that the system will work regardless of the arrangement of the locomotives.

14 Claims, 7 Drawing Sheets

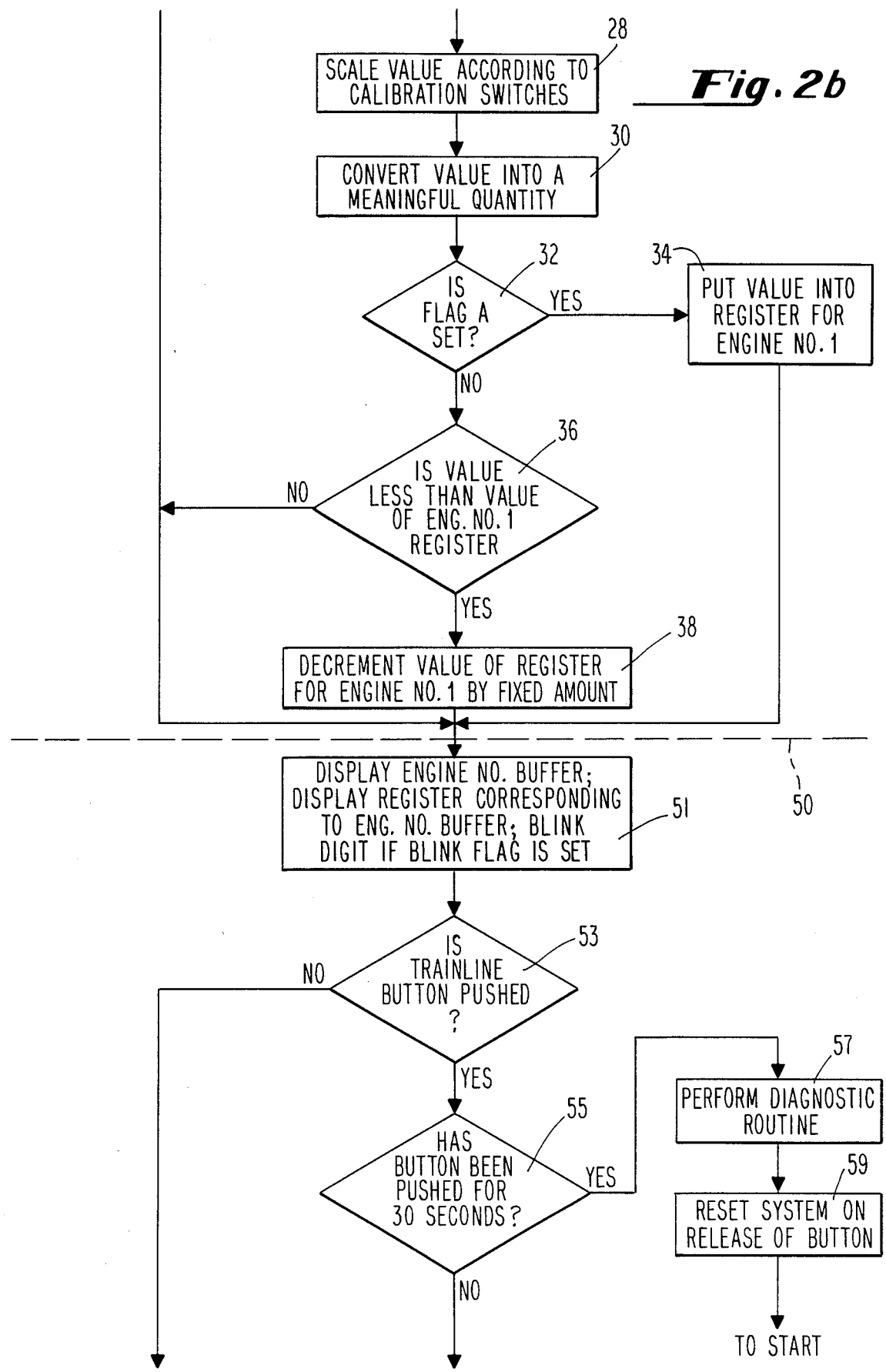

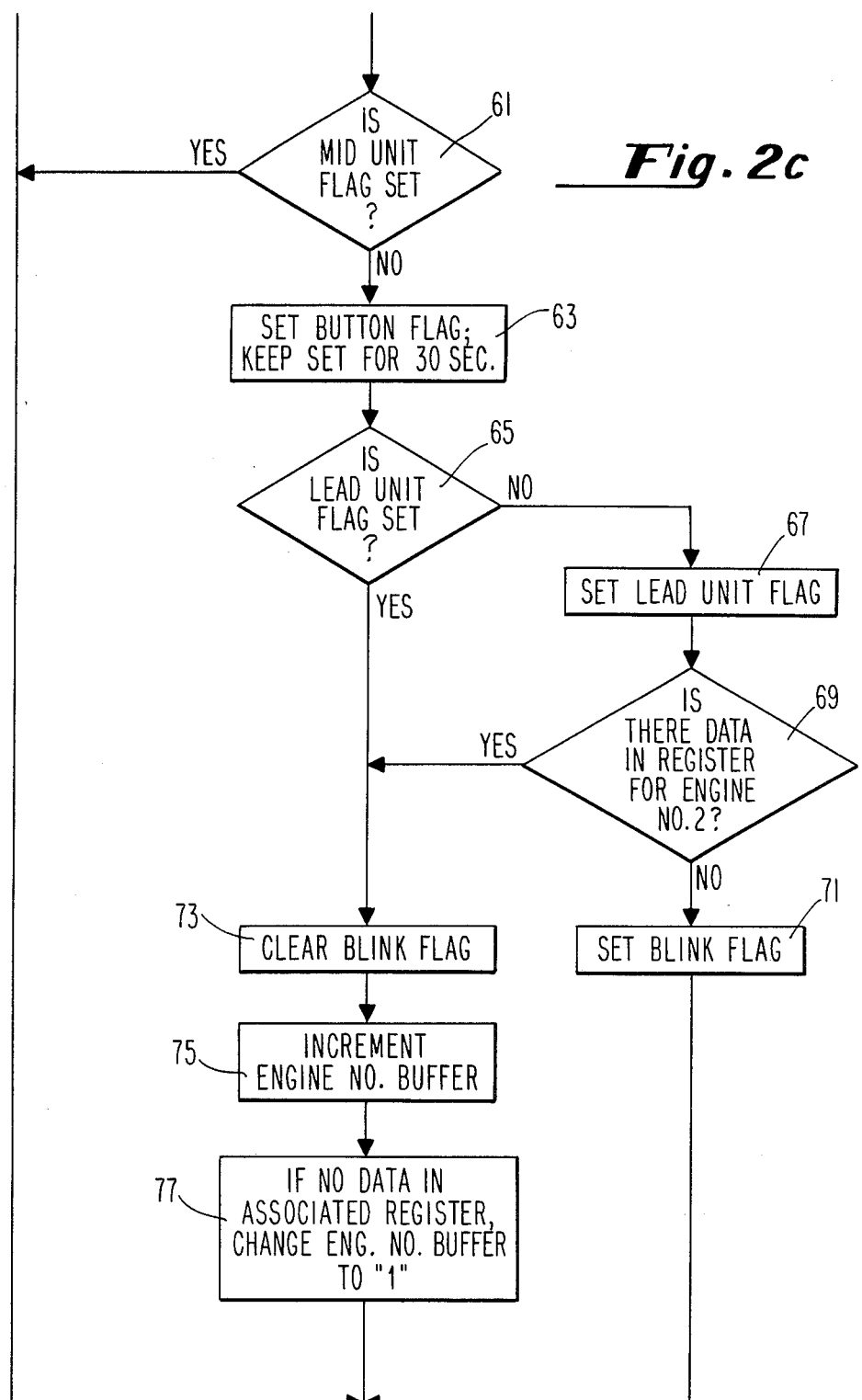

CONDITION MONITORING SYSTEM FOR LOCOMOTIVES

BACKGROUND OF THE INVENTION

This invention relates to the field of management and control of locomotives and trains, and discloses a unique system for monitoring conditions in any of a plurality of cars in a train. However, the invention can be used in other applications, as described below.

One of the problems in the operation of modern locomotives, especially in freight trains, is the difficulty in monitoring the amount of fuel remaining in the train. Freight trains typically include up to about six locomotives, coupled together at the front of the train, followed by up to several hundred cars. Each locomotive is self-contained, and includes its own fuel tank. In most train systems of the prior art, there has been no reliable and convenient means of measuring the amount of fuel in each tank. Even experienced train crews have been surprised to find their fuel tanks suddenly empty, midway between fueling terminals. This situation obviously results in great expense and inconvenience.

Most of the fuel gauges used on locomotives, in the prior art, have not been accessible to the train crew while the train is moving. Instead, locomotives of the prior art have been provided with sight glasses, which measure the top 1000 gallons of fuel in the tank. Some are equipped with float gauges, which can be read by an observer on the ground, while the train is stopped. These float gauges are notoriously inaccurate, and cannot be read from the walkways along the cab or from inside the cab. Hence, such gauges cannot be used while the train is moving. One example of a fuel gauge for locomotives, employing a gauge glass assembly, is shown in U.S. Pat. No. 4,454,759.

There have recently appeared several types of electronic fuel gauges for locomotives. These gauges employ a pressure sensor at the bottom of the fuel tank. The sensor produces a voltage which is transmitted along a cable to apparatus in the cab which converts the voltage to a meaningful display. The sensor can be a pressure transducer, of the type shown in U.S. Pat. Nos. 3,036,463, 3,054,292, or 3,726,140, or any other equivalent type. An example of the use of a microprocessor to interpret the data obtained from such transducers is shown in U.S. Pat. No. 4,386,406. In the latter patent, the microprocessor stores data on the relationship between the output of the correct amount of fuel. A somewhat similar scheme is employed in the computer-based fuel indicator described in U.S. Pat. No. 4,402,048.

Other examples of fuel monitoring systems which are useful in situations involving a plurality of tanks are shown in U.S. Pat. Nos. 3,958,107, 4,306,579, and 4,513,617. The latter patent deals with monitoring the state of the many tanks in a gasoline station. The former patents are concerned with monitoring the fuel tanks in an aircraft. All of the above-cited patents are incorporated by reference into this specification.

While some of the electronic gauges currently available enable the train crew to monitor fuel levels while the train is moving, none allows the monitoring of fuel levels in any locomotive where there are no crew members. Even with the electronic gauges described above, if the engineer needs to know whether a fuel stop is necessary, the train must be stopped, and the gauge in each locomotive must be checked individually.

The same considerations apply to the monitoring of parameters other than fuel quantity. For example, locomotives have a hopper for storing sand, which is sprayed onto the track when the train is started, to provide traction. The amount of sand in the hopper needs to be monitored. It is also desirable that the engineer know the level of air pressure in the air brakes for each locomotive. Oil levels and water levels are further examples of parameters to be observed.

The present invention provides a solution to the problem of monitoring parameters in a plurality of railroad locomotives or cars. The system of the present invention is easy to install, and easy to use. The system has the advantage that a plurality of identical components can be installed in a plurality of locomotives or cars, without regard to the order of the cars. The system compensates for whatever differences exist among locomotives, such as in the size and shape of the fuel tanks, by providing means for calibrating the particular components installed in a given locomotive.

When the system is used to monitor fuel quantity, the engineer can make informed decisions about whether and when to stop for refueling, thereby achieving significant savings in operating costs. But, as stated above, the system can be used to monitor other conditions in each locomotive of the train, without the necessity of leaving the lead locomotive.

While the invention is described mainly with respect to railroads, it is understood that the invention can also be used in other contexts, wherever it is necessary to monitor a parameter in a plurality of similar modules. Thus, the invention could be used to measure parameters in the tanks of an airplane, or to measure conditions in a plurality of buildings, or in a wide variety of other applications. The invention can be used with modules which are fixed, i.e. modules whose sequence is not easily changed, but it is especially useful with modules whose order is changed frequently, as is true in the case of a plurality of locomotives or railroad cars.

SUMMARY OF THE INVENTION

The present invention, in one embodiment, comprises a plurality of microprocessors, each located in a separate locomotive of a train. Each microprocessor is connected to receive a signal derived from the output of a measuring device, such as a fuel gauge, on the same locomotive. The microprocessor can be connected to a display apparatus, and each locomotive can have one such display. All of the microprocessors are programmed in substantially identical fashion, making it possible to use the same equipment in all of the locomotives of the train.

The microprocessor in each locomotive repeatedly samples a condition or parameter in the locomotive, such as the level of fuel in a tank, and displays the result on the display apparatus.

Each microprocessor is also in constant communication with the other microprocessors. The signals can be sent along one of the wires of the "train line", the set of cables linking all cars of the train, or by any other means. The microprocessors are programmed to interpret the pattern of signals sent back and forth among them, so as to determine which microprocessor belongs to the "lead" locomotive, which one is in the end locomotive, and which ones are in the middle. The microprocessors are programmed to transmit forward, in the train, the data from each measuring device.

Each microprocessor is provided with a switch, which when actuated, from the lead locomotive, causes the display to show the value of the parameter for each successive locomotive. Information for any locomotive can be obtained by repeatedly pressing the switch, until the display shows the information for the desired locomotive. In this way, the operator in the lead locomotive can monitor remotely the fuel available in any of the other locomotives, without stopping the train.

The programming of the microprocessors is designed to be independent of the order or direction in which the locomotives are arranged. The microprocessors automatically determine which one is in the lead locomotive, and in which direction each locomotive is facing. Thus, a middle locomotive during one run can become a lead locomotive during another trip, without any modification of the apparatus. Even the orientation of an individual locomotive can be reversed, without affecting the operation of the system. Furthermore, the system is programmed to operate regardless of the number of locomotives. It will work with as few as one locomotive, or with any other number desired.

The invention can derive its power from the existing power supply for the train, and can use one of the train line cables for purposes of data transmission. Installation of the system on existing trains is thus very easy.

It is therefore an object of the invention to provide a system for monitoring various conditions on different locomotives or other units of a train.

It is another object of the invention to provide a system which enables the operator of the train, located in the lead locomotive of the train, to monitor conditions in all of the other locomotives or cars, without leaving the lead locomotive, and without stopping the train.

It is another object to provide a system which enhances the efficiency of operation of railroad trains.

It is another object to provide a system which reduces the likelihood that a train will need an unexpected refueling.

It is another object to provide a system as described above, wherein the system comprises a plurality of substantially identical units, each of which can be installed on any of the locomotives of a train.

It is another object to provide a system as described above, wherein the system does not require that the locomotives or cars of a train be coupled in any particular order.

It is another object to provide a system for monitoring one or more conditions in a plurality of similar modules.

Other objects and advantages of the invention will be apparent to those skilled in the art, from a reading of the following brief description of the drawings, the detailed description of the invention, and the appended claims.

BRIEF DESCRIPTION OF THE DRAWINGS

FIGS. 2a through 2e comprise a flow chart, illustrating an embodiment of the logic according to which the microprocessor, shown in block form in FIG. 1, is programmed.

DETAILED DESCRIPTION OF THE INVENTION

Figure 1:
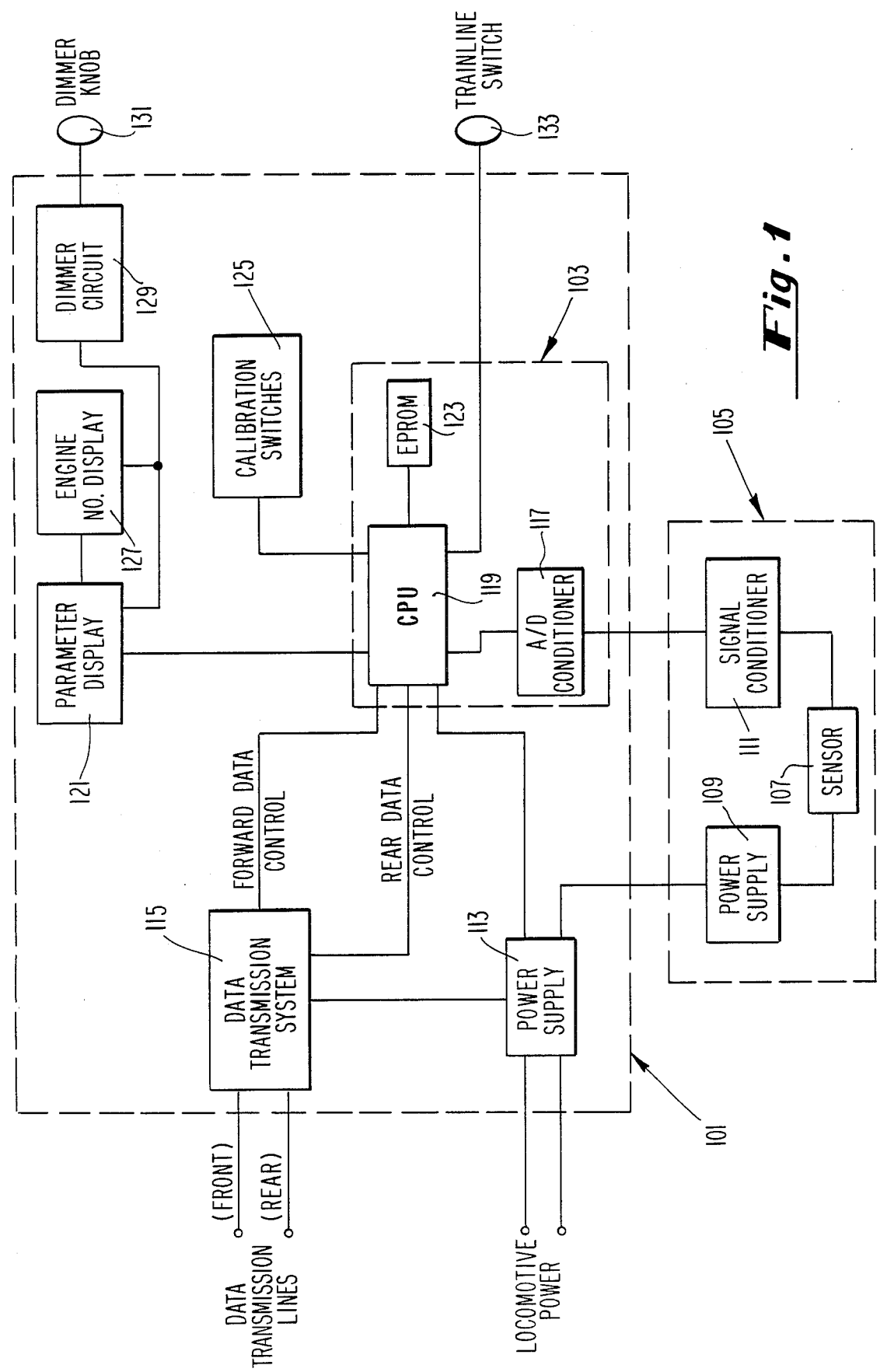
FIG. 1 is a block diagram of one embodiment of the apparatus that is placed in one of the locomotives or cars of a train, according to the present invention.

The present invention will be described with respect to one embodiment, namely, a system which enables the operator of a train to monitor the amount of fuel in each tank of each locomotive, without leaving the lead locomotive. However, as stated above, the invention is not limited to the monitoring of fuel levels; any other measurable parameter can be tracked, within the scope of the invention. And as stated above, the invention is not limited to use in the railroad field. The invention can be used in any context wherein it is necessary to monitor the same parameter, or set of parameters, in a plurality of similar modules.

As used herein, the term "units" or "units of the train" will be used to indicate the locomotives, or other cars, of a train. This terminology is chosen to emphasize the fact that the embodiment described below is only one of many possible applications, and that the invention is not restricted to locomotives or cars of a train.

In the embodiment shown in the drawings, a transducer device and a display device are installed in each a plurality of similar units. In the example to be described, where the units are locomotives of a train, each unit can be self-contained, including a fuel tank and an engine, and a plurality of such units are coupled together to propel the entire train. Since the parameter being monitored, in this example, is fuel quantity, only the locomotives are the units which are of interest. But the invention could also be used to monitor conditions in the other cars of the train.

FIG. 1 is a block diagram of the apparatus which is installed in each unit of the train. The dotted lines indicate possible groupings of components. It is understood that the groupings are only suggestive, and not limiting, and that many other arrangements are feasible. Reference numeral 101 represents the display device, which includes a computer 103. A transducer device is indicated by reference numeral 105.

Transducer device 105 includes sensor 107, power supply 109, and signal conditioner 111. Sensor 107 can be a pressure transducer, of the type shown in the patents cited above, or any other device which measures a physical quantity and generates a signal representing the measurement. The transducer can measure an analog or digital quantity. If the parameter being measured is analog, the transducer may be equipped with its own analog to digital converter, or the signal can be converted later, in the computer.

In the embodiment shown, the tranducer measures the level of fuel in the tank by measuring the pressure exerted by the liquid, and generates a signal proportional to this level. Signal conditioner 111 modifies the signal to compensate for environmental effects. The signal conditioner can be used for altering the voltage range of the signal, to reduce the effect of electrical noise, or for simply varying the output of the transducer for a given input parameter. The conditioner thus can compensate for variations among the several transducers, and can insure that all transducers in the train will respond with the same output signal, under similar physical stimuli. The transducer 105 is powered by transducer power supply 109.

The display device 101 obtains power from the locomotive power lines, and, in power supply 113, converts that power into the proper voltages for operation of all components of the system. The power supply 113 is connected to transducer power supply 109. The power to the transducer is current-limited for safety, in the event of transducer damage. While the transducer and display devices are shown as having separate power supplies, it is also possible for the transducer to be designed to operate directly from the power supply 113.

The computer 103 includes central processing unit 119 (also referred to as the CPU, or the microprocessor), an analog to digital (A/D) converter 117, and an erasable programmable read-only memory (EPROM) 123. Analog to digital converter 117 receives the analog signal from signal conditioner 111, converts the signal to digital form, and connects the output to the CPU. It is also possible to provide two transducers in the same fuel tank, diagonally opposed from each other, to compensate for the effects of rolling or tilting of the tank. In this case, there would be two input lines entering A/D converter 117, and the converter could be designed to use the average of the two readings. The latter function could alternatively be performed within the CPU. Also, as noted above, the analog to digital converter could be placed in other locations in the system.

The CPU 119 controls the overall operations of the system. EPROM 123 permanently stores the program for the CPU. The logic of this program is illustrated in the flow chart of FIG. 2, and will be described in detail below.

CPU 119 is connected to parameter display 121 and engine number display 127. The term "engine number" is used on the assumption that the units described are locomotives. Displays 121 and 127 can be light-emitting diodes (LED), or liquid crystal displays (LCD), or any other suitable display. The engine number display 127 shows the number of the unit whose parameter is being displayed on display 121. For example, if display 127 shows a "3" and display 121 shows "2350", it means that engine No. 3 has 2,350 gallons of fuel in its tank. The "engine number" is defined in relation to the unit containing the display device being monitored. Thus, engine No. 3 means the engine located two units to the rear, from the reference unit. Engine No. 1 is, by definition, the engine in which the display device is mounted. By virtue of the program logic, to be described below, each CPU "knows" whether or not it belongs to the lead unit. The microprocessor for the lead unit acts as the "master", and can display the amounts of fuel in each tank for each of the succeeding units.

Both display 121 and display 127 are connected to dimmer circuit 129, which is connected to dimmer knob 131. By turning the dimmer knob, the operator can adjust the brightness of the displays.

It is not essential to the invention that a display device be present in the train. It is only necessary that the microprocessor communicate the data in some manner. The microprocessor can be connected to transmit its output, by wire, to another location within the train, or it can transmit data, by radio, to a station far away from the train.

CPU 119 is connected to calibration switches 125. These switches are internal digital switches which are normally adjusted once, when the system is first installed in a unit. The switches can be used to adjust the zero point and the gain of the transducer, and also to inform the CPU about what shape of fuel tank is being used in that unit.

Train line switch 133, which is connected directly to the CPU 119, is the major control used by the operator of the system. It is preferably a pushbutton switch, although any switch structure could be used. When this switch is first actuated, the CPU establishes communication with the other CPUs in the train, quickly determines that it is the CPU of the lead unit, and changes the display to show the amount of fuel in engine No. 2, i.e. the next unit towards the rear of the train. Each time the switch is pushed, the information from the next unit in the series appears on the display. When the display shows the data from the last unit, one more push of the switch will cause the display to revert to the data for engine No. 1, i.e. the reference unit, and so on.

The CPU 119 is also connected to data transmission system 115. System 115 sends and receives digital data, to and from the other CPUs in the other units. The system sends data both forward and backward, along lines 135 and 137, respectively. The data can be carried along one of the wires of the "train line", i.e. the set of cables which run through all the cars of a train, although other means of data transmission, such as radio communication, could be used.

The data transmission system 115 is designed to transmit two types of signals, a so-called "break" signal, and actual data signals. The break signal can be created by "toggling" the line, i.e. repeatedly lowering the voltage on the line, to produce a "square wave" signal. This break signal is used by the microprocessors to indicate their presence to each other. Since the data transmission system operates in both directions, the system both transmits and receives breaks. As will be apparent from the program logic described below, a break transmitted to an adjacent unit is "answered" with a break from that unit. After the microprocessors have detected the appropriate answer breaks, the actual data transmission can be made. As will be described in more detail below, system 115 accepts a data transmission from another unit, and transmits forward the data it has received from the units to the rear, together with the data from its own unit.

Figure 3:
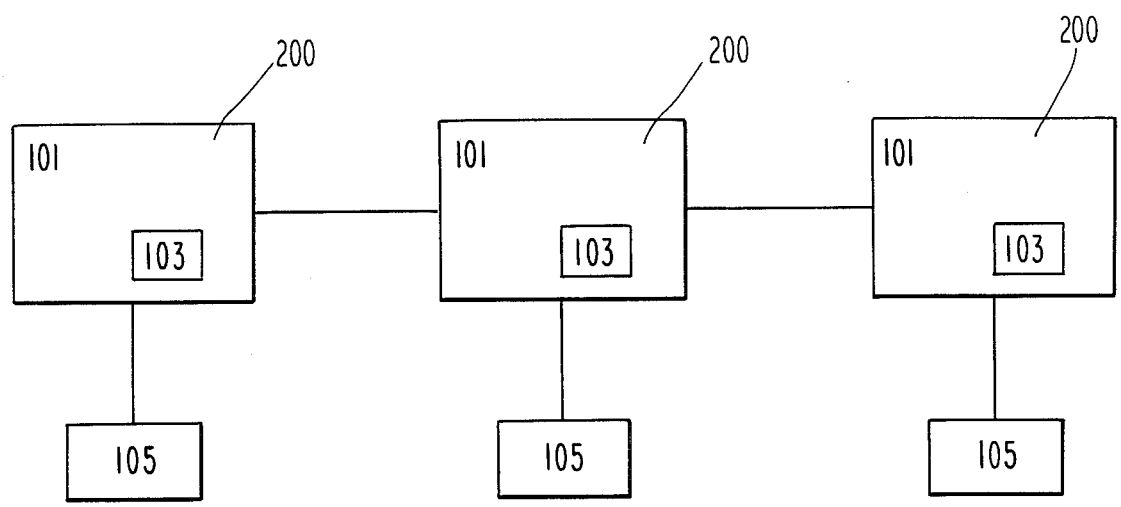
FIG. 3 is a block diagram showing a plurality of units of a train, each having the apparatus of the present invention.

FIG. 3 shows the invention as implemented in a three-car train. The cars are designated by reference numeral 200, and each car is shown as having a display device 101, a computer 103, and a transducer 105.

An example of the manner of programming of the microprocessor, or CPU, 19 is illustrated in the flow chart shown in FIGS. 2a through 2e. It is important to note that the same apparatus is installed in each unit of the train, and that, in this example, the microprocessors are therefore programmed substantially identically. Thus, the flow charts illustrate the logic performed in any one of the several units. To understand the invention, it must be remembered that all of the microprocessors in all of the units are repeatedly executing the program depicted in the flow chart, although, of course, the various microprocessors will, in general, be executing different parts of the program at a given instant. Also, as will be apparent, the microprocessors respond differently according to whether the unit is at the front, the rear, or in the middle of the group of units.

The flow chart can be divided, for ease of understanding, into three sections, which are separated by dotted lines 50 and 80. The first section deals with the taking of measurements and their interpretation. The second section deals with the displaying of the data. The third section relates to the data transmissions among the various units.

Figure 2A:
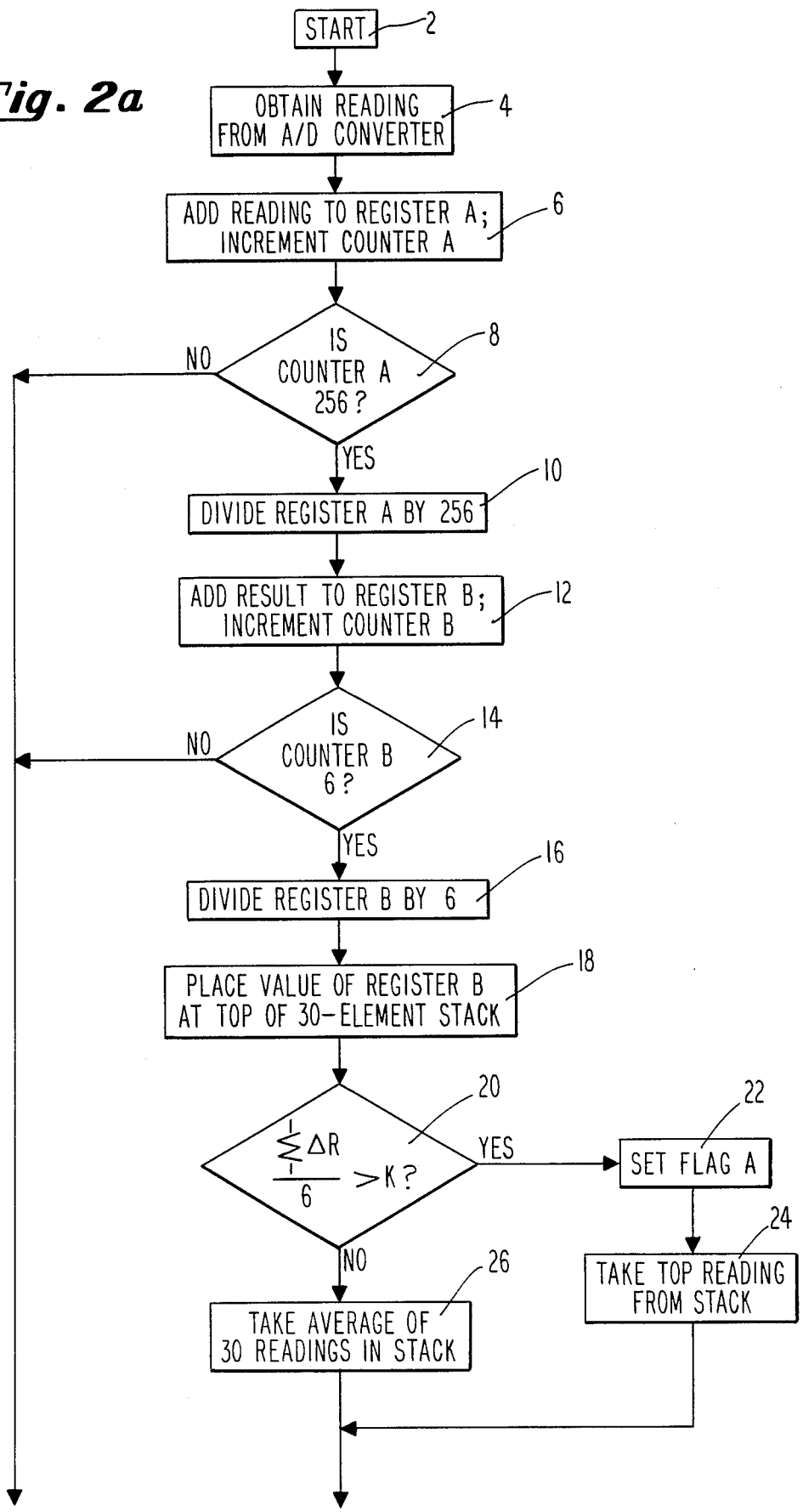

As shown in FIG. 2a, the system starts in block 2, and obtains a reading from an analog-to-digital converter, in block 4. The reading taken in block 4 can come from a pressure transducer in a fuel tank in a locomotive, or it can represent the output of any other sensor measuring any other parameter or condition of interest. The reading is added to the contents of a data register, designated "Register A" in block 6, and a counter, labeled "Counter A" is incremented by one.

Test 8 determines whether Counter A has reached 256. If so, the contents of Register A are divided by 256, in block 10, and the result is added to the contents in a second register, called Register B, in block 12. A counter labeled as "B" is also incremented by one.

Test 14 determines whether Counter B has reached 6. If so, the contents of Register B are divided by 6, in block 16, and the result is placed at the top of a 30-element stack of values, in block 18.

If either Counter A or Counter B has not reached its preset limit, the program skips to the beginning of the next section, as shown.

It is clear that the system is programmed to compute an average reading, based on the last 256 measurements, and then to compute an average of that average, based on the last 6 entries. Of course, numbers of iterations other than 256 and 6 can be used, and the size of the stack can also be varied.

In test 20, the average of the differences of the last six average readings, placed in the stack, is compared with a constant, designated as K. This test tells the program how fast the readings are changing. If the parameter being measured is fuel quantity in a tank, a high reading for this average indicates that the tank is being filled. In the latter case, K might be chosen to represent a value of about 40 gallons. If the average difference is greater than K, then flag A is set, in block 22, to indicate that the parameter is undergoing rapid change. The system then takes the most recent entry from the stack, in block 24, for use in the next section of the program. If the average difference does not exceed K, then the system uses the average of all 30 values in the stack, as shown in block 26.

In block 28, in FIG. 2b, the value to be used is scaled according to the settings of the calibration switches 125 of FIG. 1. These switches establish the zero point, and the range, of the parameter being measured. The value is converted to a meaningful quantity in block 30. For example, if the parameter being measured directly is the number of inches of fuel in a tank, block 30 includes means for converting that number into a number of gallons. This can be done by including, in EPROM 123, a conversion table which the program uses to translate the number of inches directly into a gallonage figure. The function performed in block 30 can also include taking into account the shape of the tank in a particular unit, so that the result will be correct for non-rectangular tanks.

Information on the tank shape (or other similar data) can be encoded by the settings of additional switches 125. Of course, if the apparatus is taken out of its unit and installed elsewhere, the switches would need to be re-set. Block 30 has similar functions for other parameters being measured; the above description is only one example.

Test 32 determines whether Flag A is set. If so, the computed value is placed in a register representing the parameter for "Engine No. 1", as shown in block 34. From the standpoint of the program, "Engine No. 1" is the unit in which the microprocessor is located. "Engine No. 2" means the next unit towards the rear, and so on. Obviously, each CPU "thinks" it is in Engine No. 1, except under certain conditions to be described below.

Block 34 is invoked only when Flag A is set, i.e. only when the value of the parameter is found to be changing rapidly. In this case, it is desirable to make the latest value of the parameter available for display as soon as possible.

If Flag A is not set, the program continues in test 36, where it determines whether the value is less than the value presently in the register for Engine No. 1. If so, the program decrements that value by a fixed amount. The fixed amount represents the minimum fluctuation in the reading desired on the display. In the example of measurement of fuel in a tank, the minimum fluctuation could be 50 gallons. The logic of the program insures that the value displayed will not differ from the true value by more than this fixed amount. With each iteration of the program, the displayed value will be decremented until the value is correct.

It is also possible simply to display the exact value of the parameter, and to display the most recent measurement, without any averaging. Such changes are also within the scope of the invention.

The display section of the program begins in block 51, wherein the value of the Engine Number Buffer, and the register corresponding to the Engine Number buffer, are displayed. The "Engine Number Buffer" is a data register which specifies which unit is being monitored. Each unit considers itself to be unit No. 1, but the program logic permits only the lead unit to display data from the other units. For example, if the program finds itself in the lead unit, and if the Engine Number Buffer contains a "3", then the corresponding register will contain a number representing the parameter in Engine No. 3, i.e. the unit which is two units to the rear.

In block 51, the program also checks the "blink flag", to be described below, and causes the display to blink if that flag is set. A blinking display is an indication that the lead unit has not yet established communication with the other units, as described below.

Test 53 determines whether the train line switch 133 is pushed. Test 53 preferably includes a swith "debounce" routine, which analyzes the results of repeated measurements of the switch position, and determines whether the switch is, in fact, being held down, or whether an apparent signal from the switch is a mere circuit transient. If the switch is not pushed, the program bypasses the remainder of the display section, and continues with the data transmission section.

If the train line switch is pushed, the program, in test 55, determines whether the switch has been pushed for 30 seconds, with the aid of an appropriate timing mechanism (not shown). If the switch has been held for 30 seconds, the system continues in block 57, where it performs a diagnostic routine. The diagnostic can be, for example, the summation of all elements stored in EPROM 123. If the sum does not agree with a known value, an error message can be flashed. Other types of diagnositc routines could also be used here. The system resets itself in block 59, when the button is released, and the program starts from the beginning.

If the train line switch has been pushed, but has not been held down for 30 seconds, the system proceeds to display the appropriate information to the operator. In test 61, in FIG. 2c, the system determines whether the "mid unit" flag is set. This is flag indicating that the unit is neither the lead unit nor the end unit, and is set in a section of the program to be described below. If the flag is set, the program skips the remainder of steps in this section, and continues with the data transmission section. If the flag is not set, then the program sets the flag, in block 63, and through an auxiliary timing device, keeps that flag in the set position for 30 seconds. When the train line button is pressed, the microprocessor tries, for 30 seconds, to establish itself as the lead unit. In test 65, the "lead unit" flag is checked, and it is set in block 67 if it is not already set. If it later turns out that that unit is not physically the lead unit, control will be relinquished to the true lead unit after a few iterations.

In test 69, the system determines whether there is data in the register for Engine No. 2. If not, the system sets the blink flag, in block 71, to indicate that communication with the next unit has not yet been established. If the lead unit flag is already set, or if there is already data for Engine No. 2, then the blink flag is cleared, in block 73. The Engine Number Buffer is incremented by one in block 75, and the contents of the register corresponding to this value are displayed. If the associated register is empty, then the Engine Number Buffer is reset to one. Thus, as the train line switch is repeatedly pushed, the display shows the parameter for all the units, returning to the lead unit after the value for the end unit has been displayed.

Figure 2D:
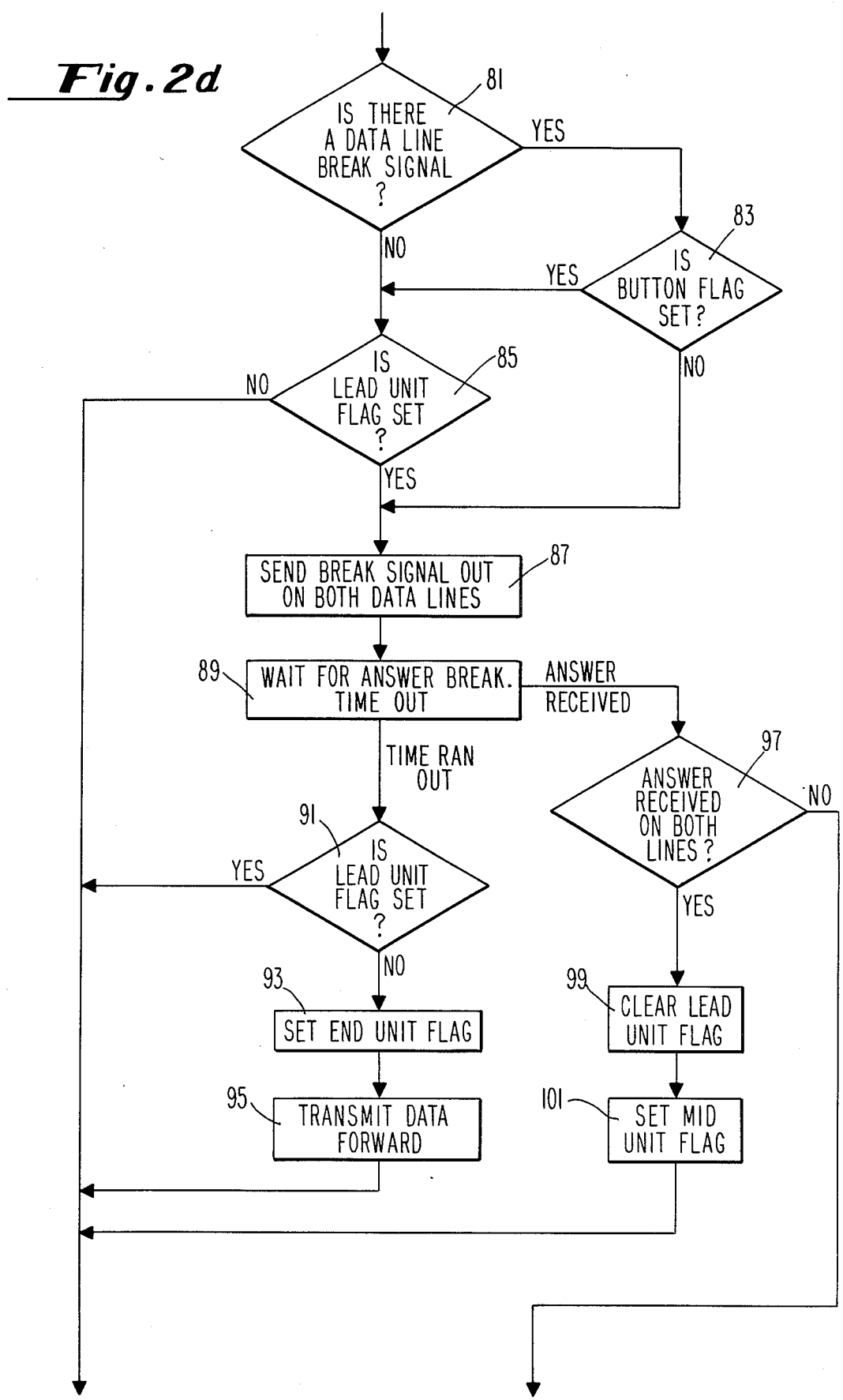

The data transmission section begins in FIG. 2d. The system, in test 81, determines whether a data line "break" has been received. A "break" can be a simple toggling of the line, described above, or it can be any other predetermined signal. Breaks are used by the microprocessors to signal their presence to the microprocessors in adjacent units. If a break is not detected, the program determines whether the lead unit flag is set, in test 85. If the lead unit flag is not set, and no break has been detected, the program returns to the beginning, realizing that it is the only unit in the train. If a break is received, the program tests whether the button flag is set, in test 83. If so, the program checks whether the lead unit flag is set, in test 85. Otherwise, the program proceeds directly to block 87.

In block 87, the system sends break signals simultaneously along data lines 135 and 137, of FIG. 1. That is, breaks are sent both forward and rearward. The system then waits, in block 89, for an "answer" break, from an adjacent unit, for a specified time. If no answer is received, the system checks the lead unit flag, in test 91. If the lead unit flag is set, the system returns to the beginning. But if the flag is not set, then the unit must be an end unit, and the program sets the end unit flag in block 93. The system then transmits a set of data forward, in block 95, and returns to the beginning of the program.

The data transmitted forward preferably include a starting marker, a value representing the number of engines, of which the unit is "aware", the parameter values for each of such engines, and an ending marker. For example, if the train has five units, then the number of engines, as seen by the fourth unit, will be two, and the data string will include the headers, the number of engines, and two parameter values.

If an answer break is received in the allotted time, the system determines whether an answer has been received on both data lines. If so, the system clears the lead unit flag, in block 99, and sets the mid unit flag, in block 101. If an answer is received on both lines, the unit must be a middle unit. The program then returns to the beginning.

Figure 2E:
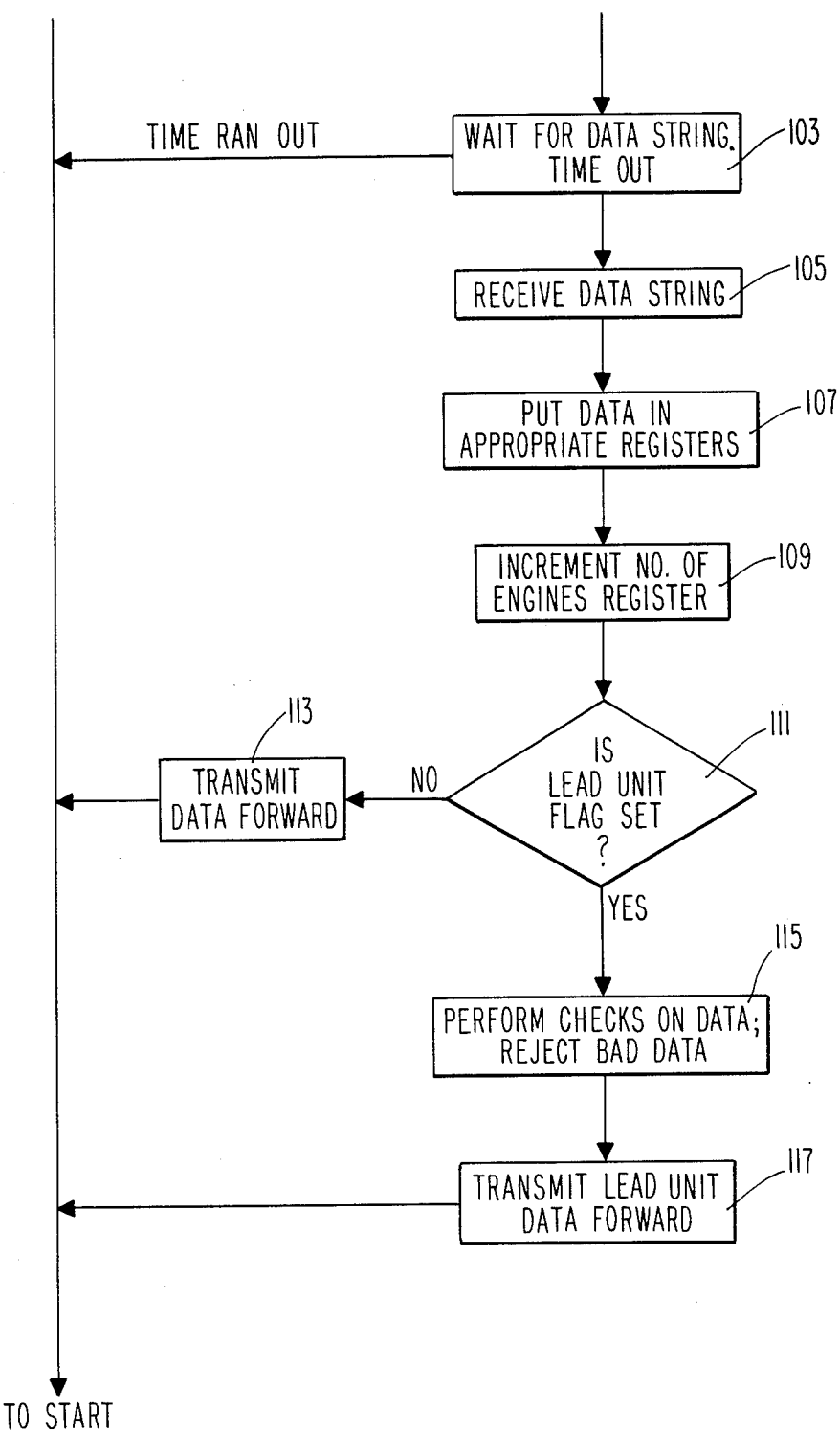

If an answer is received on only one line, the program continues in block 103 of FIG. 2e. The system waits, for a prescribed time interval, for a data string from the units to the rear. If time runs out, the program returns to the beginning. If a data string is received in time, it is read in block 105, and the data for the various units is placed in appropriate registers, in block 107. The system increments the register indicating the number of engines present, in block 107, to conform with the data it has received. The system in a particular unit thus stores data of its own (the "Engine No. 1" data), as well as the data received from the next unit to the rear. The latter data represent information for the remainder of the units.

If the lead unit flag is not set, as determined in test 111, the system then transmits all its data forward, block 113. The program then returns to the beginning. It is thus apparent that the end unit transmits its own data to the next unit, that the next unit transmits the end unit data plus its own to the unit immediately preceding, and so on. Data therefore travel from the rear to the front of the train, the length of the data string increasing as the signal propagates forward through the train.

If the lead unit flag is set, the data are checked for validity, in block 115. The validity check can include a parity test, and/or a comparison of the data with their complement. Other types of tests can also be used. The complement test is more reliable than the parity test in determining whether there has been an error in data transmission. If the data are bad, they are rejected. Presumably, the next iteration of the program will yield "good" data.

The system then transmits data for the lead unit "forward" in block 117. This transmission does not reach another unit; by definition, there is no unit ahead of the lead unit. Instead, these data are available for transmission to a computer which has been previously installed on the train, or to a monitoring device that serves a diagnostic purpose. After executing the steps in block 117, the system returns to the beginning.

The program logic represented by FIGS. 2d and 2e, i.e. the data transmission section of the program, insures that breaks propagate only from the front to the rear of the train. Although breaks are transmitted in both directions, the breaks transmitted forward do not cause any further breaks to be generated. The truth of the foregoing comment is apparent from the flow chart, as explained below.

A sequence of breaks can only be initiated by the unit which "believes" itself to be the lead unit. Initially, there are no breaks detected, and the program passes from test 81 to test 85. If the unit is not the lead unit, test 85 causes the program to bypass the data transmission functions, and return to the beginning. But if the lead unit flag is, in fact, set, then the lead unit sends a break out on both lines and waits for an answer.

Again, it must be recalled that the same program logic is being executed in the several units simultaneously, although the program will, in general, be executing different portions of the program at a given instant. Thus, when one considers what the program in the second unit is doing, it is clear that the second unit receives the break, in test 81, proceeds to test 83, and then goes to block 87, because the button flag is not set. (It is assumed here that the button flag is not set because crew members are normally located in the lead unit only.) So the second unit sends breaks out on both data lines, and waits for answers. Because the program in the lead unit receives an answer on one line only, it proceeds through test 97 to block 103, and waits for data.

Meanwhile, the second unit has also received an answer, in the same way, from the third unit. The second unit waits for a data string, and after receiving said string transmits its data forward, in block 113. These data are added to the data from the second unit, which then transmits its data to the lead unit. Eventually, the sequence of breaks reaches the end unit. When the end unit transmits its answer breaks, the forward-going break simply answers the break of the preceding unit, but does not induce another break from the next-to-last unit, because the next-to-last unit is then waiting for data, in block 103. The end unit also cannot receive a break from its rear side, because it is the end unit. Thus, time runs out while the end unit waits for an answer break. The program sets the end unit flag, in block 93, since the lead unit flag would not have been previously set. Data from the end unit are transmitted forward in block 95. Of course, if the lead unit flag had been set, then the program would return to the beginning; this would occur if the train had only one unit.

Thus, data are propagated from the rear to the front of the train. Also, it is clear that there is constant intercommunication among the units. Whether or not the lead unit detects a break, it will, due to the program logic shown, continue to initiate break signals, which will then propagate down the line of units, causing those units to transmit their data forward.

If a member of the train crew happens to enter a middle unit, and pushes the train line button, that unit will momentarily "think" that it is the lead unit, and the above-described sequence of data transmission would be somewhat modified. But in less than one iteration, the program will recognize this condition, and the system will know which unit is the "true" lead unit. A unit which receives breaks on both data lines cannot be the lead unit, and its lead unit flag would be cleared in block 99.

A computer program listing is shown, as an exhibit to this specification, which has been used to implement one embodiment of the invention, namely, the embodiment wherein the invention is used to monitor the amount of fuel in each locomotive of a train. It is understood, however, that the invention is not limited by the programming steps shown, and that the invention can be implemented in many other ways, and used in many other contexts. As stated above, the invention can be used to monitor one or more measurable parameters, and not just the amount of fuel in a tank.

It has been noted above that the microprocessors in the various units of the train can be substantially identically programmed. It is not necessary, however, that the programming be identical; what is necessary is that the programming of the microprocessors be compatible with each other. Itg is possible, for example, to construct a working system wherein one or more of the microprocessors in the train omit the display section of the program, which means that the microprocessor will measure and transmit data, but will not display anything. Such a system would be satisfactory if used in a middle unit.

As another example of a variation in program logic, it is possible for different microprocessors to sample measured data at different rates, and to average the readings over different periods. As long as data can be sent and received among the series of units, the system will tolerate these variations in the programming of the microprocessors. Of course, if the microprocessors are, in fact, identically programmed, the system is certain to work. But, in general, the software can be modified, and the system will still be compatible with the revised versions, subject to the limitations discussed above.

The invention is also not limited to use with trains; any system having a plurality of similar modules can employ the invention. Thus, one or more parameters can be monitored in each of several buildings, or in each of several stationary oil tanks, or in other similar applications. The invention is, of course, particularly useful where the order of the modules needs to be changed frequently, as is true in the railroad context. As shown above, the programming of the microprocessors is such that the same hardware and software will work for any rearrangement of the units of a train.

It is also understood that both the hardware and the programming logic described above can be varied considerably within the scope of the invention. For example, it is not necessary that the train line switch be a manually-operated control. The switch could be replaced by an automatic switch means which causes the system to cycle through the various units of the train automatically, communicating data from each unit according to a previously timed sequence.

The communication protocols described above for the microprocessors can also be varied. It is possible, for example, to eliminate the break signals if each microprocessor was replaced by a so-called "dedicated" microprocessor which could continually send and receive data.

Different rates of sampling, smoothing, and averaging the data can be chosen. Different types of checks on the validity of the data transmitted among the units can be employed. Diagnostic procedures can be added or removed, without affecting the nature of the invention. Different types or numbers of parameter sensors can be employed, and various manual controls and digital switches can be added or deleted to suit particular needs. More than one parameter can be monitored simultaneously. The communication among the microprocessors need not be accomplished by direct connection, but could be done by radio, or by any other means. It is therefore understood that these and other modifications are to be deemed within the spirit and scope of the following claims.

What is claimed is:

1. A system for monitoring a parameter in each of the units of a train, the train having a lead unit, the system comprising:

(a) a plurality of sensing means, at least one of each sensing means being disposed in each unit, each sensing means comprising means for measuring the value of the parameter in said unit and generating a signal corresponding to the measurement of the parameter, (b) microprocessor means, disposed in each unit, and connected to the sensing means for that unit, each microprocessor means being programmed in a substantially identical manner, each microprocessor means being programmed to convert the signal from its associated sensing means into a number, each microprocessor means being programmed to send data in two directions, wherein data can pass from one unit to another through each microprocessor means, each microprocessor means being programmed to determine whether that microprocessor is located in the lead unit of the train, such determination being made independently of a setting of any external control, and (c) switch means associated with each microprocessor means in each unit, for selecting a train unit, the output of whose sensing means is desired to be displayed.

2. The system of claim 1, wherein the microprocessor in each unit is programmed to send and receive communication signals to adjacent units, wherein the presence or absence of a communication signal received by a given unit indicates the presence or absence of an adjacent unit in the system, and wherein the microprocessor is programmed to determine whether its unit is a lead unit, an end unit, or a middle unit, according to the pattern of answers to communication signals which it receives.

3. The system of claim 2, wherein the microprocessor in each unit is programmed to transmit data to the microprocessor in the next unit, in the forward direction.

4. The system of claim 3, wherein the microprocessor in each unit is programmed to communicate the value of the measured parameter in each succeeding unit, in response to successive actuations of the switch means.

5. The system of claim 4, wherein the microprocessor in each unit is programmed to sample repeatedly the output of the sensing means in that unit, and to communicate a number corresponding to the average reading from the sensing means, the average being taken over a predetermined number of measurements.

6. The system of claim 5, wherein the microprocessor in each unit is programmed to measure the rate of change in the measured parameter in that unit, and to communicate either a recent reading or said averaged reading, according to whether the parameter is changing rapidly or slowly, respectively.

7. A system for monitoring a parameter in each of the units of a train, the train having a lead unit, the system comprising:
(a) means for measuring the parameter in each of the units of the train, each of the measuring means being located in its respective unit, the output of each measuring means comprising a signal corresponding to the value of the parameter,
(b) microprocessor means, disposed in each unit of the train, each microprocessor means being programmed in substantially identical manner, each microprocessor means having a switch means, the microprocessor means being connected to receive the signal from the measuring means in its unit, each microprocessor means being programmed to send and receive signals to and from the other microprocessor means in the other units, each microprocessor means being programmed to determine whether there are other units in the train, and to determine whether the microprocessor means itself is in the lead unit of the train, the latter determination being made independently of a setting of any external control, each microprocessor means being programmed to communicate information corresponding to the measurement represented by the signal from the measuring means for the unit in which the microprocessor means is located, when the switch means is not actuated, and wherein each microprocessor means is programmed to communicate information corresponding to measurements in other units when the microprocessor has determined that said microprocessor is located in the lead unit of the train and when the switch means is actuated.

8. A system for monitoring a parameter in each of a plurality of similar modules, the modules being connected in series, one of the modules being a lead module, the system comprising:
(a) means, disposed in each of the modules, for sensing the parameter in each of said modules,
(b) a microprocessor, disposed in each of the modules, each microprocessor being connected to receive information from the sensing means in its module, and being connected in series with the other microprocessors in the other modules, at least one microprocessor including a switch means, the microprocessors in the modules being programmed in a substantially identical manner,
wherein the microprocessor in each module is programmed to sample repeatedly the output of the sensing means in said module, wherein the microprocessors in all of the modules are programmed to send and receive communication signals, to and from adjacent microprocessors in the series, wherein the microprocessors are also programmed to send data, originating from the sensing means, to other microprocessors in the series, wherein each microprocessor is programmed to determine whether the microprocessor itself is located in the lead module, the latter determination being made independently of a setting of any external control, and wherein each microprocessor is programmed to display the parameters for successive modules, when said microprocessor is located in the lead module and when the switch means is actuated.

9. The system of claim 8, wherein all of the microprocessors are programmed to determine the order of arrangement of the modules, according to the pattern of communication signals received from the other microprocessors.

10. The system of claim 9, wherein all of the microprocessors are programmed to determine the rate of change of the parameter being measured, and to communicate either a recent value or an averaged value of the parameter, according to whether the parameter is changing rapidly or slowly.

11. The system of claim 10, wherein each sensing means generates an analog signal, and wherein each sensing means includes means for converting the analog signal to a digital signal for transmission to the microprocessor.

12. A system for monitoring a parameter in each of a plurality of similar modules, comprising:
(a) means, disposed in each of the modules, for sensing the parameter in the module,
(b) a microprocessor, disposed in each of the modules, each microprocessor being connected to receive information from the sensing means in its module, and being connected in series with the other microprocessors located in the other modules, at least one microprocessor including a switch means,
wherein the microprocessors in all of the modules are programmed to send and receive data to and from adjacent microprocessors in the series, and wherein each microprocessor is programmed to determine whether the microprocessor itself is located in the lead module, the latter determination being made independently of a setting of any external control, and wherein each microprocessor is programmed to display the value of the parameter for successive modules, if said microprocessor is in the lead module, in response to successive actuations of the switch means.

13. A system for monitoring a condition in the cars of a train, one of the cars being the lead car, the system comprising:
(a) means for sensing the condition, said sensing means being located in each car of the train, and
(b) microprocessor means, located in each car of the train, each microprocessor means having a switch means, the microprocessor means in each car being connected to receive data from the sensing means in said car, wherein all of the microprocessor means are substantially identically programmed, and wherein each microprocessor means is programmed to transmit and receive communication signals to and from microprocessor means in the other cars, wherein each microprocessor means is programmed to determine whether the microprocessor means itself is located in the lead car, the latter determination being made independently of a setting of any external control, wherein each microprocessor means is programmed to display information concerning the sensed conditions in adjacent cars as the switch means is actuated repeatedly.

14. A system for monitoring a parameter in each of a plurality of similar modules, one of the modules being a lead module, each module comprising means for sensing the value of the parameter in the module and a microprocessor means, the microprocessor means in each module being connected to the sensing means in said module to receive the sensed value of the parameter, all of the microprocessor means being substantially identically programmed, each microprocessor means being programmed to send signals continually to adjacent modules, wherein data is continually and automatically transmitted from each module, in the direction of the lead module, all of the microprocessor means being programmed to determine whether the microprocessor means itself is located in the lead module, the latter determination being made independently of a setting of any external control.

* * * * *